US010462132B1

(12) United States Patent
Brown et al.

(10) Patent No.: US 10,462,132 B1
(45) Date of Patent: *Oct. 29, 2019

(54) QUEUE MANAGEMENT BASED ON BIOMETRIC AUTHENTICATION

(71) Applicant: Capital One Services, LLC, McLean, VA (US)

(72) Inventors: Jeffrey Brown, Centreville, VA (US); Clayton Johnson, Edgewood, MD (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,367

(22) Filed: Mar. 21, 2019

Related U.S. Application Data

(63) Continuation of application No. 15/972,921, filed on May 7, 2018, now Pat. No. 10,250,599.

(51) Int. Cl.
*H04L 29/06* (2006.01)
*G06F 21/31* (2013.01)

(52) U.S. Cl.
CPC ........ *H04L 63/0861* (2013.01); *G06F 21/313* (2013.01)

(58) Field of Classification Search
None
See application file for complete search history.

(56) References Cited

U.S. PATENT DOCUMENTS

| 9,247,059 | B1* | 1/2016 | Chidambaram | .... H04M 3/5166 |
| 9,667,810 | B1* | 5/2017 | Brown | .............. H04M 15/8351 |
| 10,250,599 | B1 | 4/2019 | Brown et al. | |
| 2007/0286220 | A1 | 12/2007 | Stenning et al. | |
| 2008/0004904 | A1* | 1/2008 | Tran | ..................... A61B 5/0006 705/2 |
| 2010/0144383 | A1* | 6/2010 | Berger | .................. G06Q 10/06 455/521 |
| 2011/0110364 | A1 | 5/2011 | Fried et al. | |
| 2012/0190386 | A1* | 7/2012 | Anderson | .............. G01C 15/04 455/456.3 |

(Continued)

OTHER PUBLICATIONS

Dimaunahan, Ericson D. et al. MFCC and VQ Voice Recognition Based ATM Security for the Visually Disabled. 2017 IEEE 9th International Conference on HNICEM. https://ieeexplore.ieee.org/stamp/stamp.jsp?tp=&arnumber=8269516 (Year: 2017).*

(Continued)

*Primary Examiner* — Jeremiah L Avery
(74) *Attorney, Agent, or Firm* — Harrity & Harrity, LLP

(57) ABSTRACT

A method performed by a user device may include obtaining biometric information relating to a user of the user device using a biometric sensor of the user device; determining that the biometric information is valid; generating a biometric indicator indicating that the biometric information is valid; providing a request for a callback from an entity, wherein the request includes the biometric information indicating that the biometric information is valid; and receiving the callback from the entity, wherein the callback is received based on the biometric information indicating that the biometric information is valid, and wherein the callback is associated with an entity identifier that is not provided to the user.

20 Claims, 6 Drawing Sheets

(56) References Cited

U.S. PATENT DOCUMENTS

| | | | | |
|---|---|---|---|---|
| 2013/0244632 | A1* | 9/2013 | Spence | H04M 3/51 455/415 |
| 2016/0012465 | A1* | 1/2016 | Sharp | G06Q 20/18 705/14.17 |
| 2016/0094708 | A1* | 3/2016 | Brown | H04W 68/005 455/414.1 |
| 2016/0219142 | A1* | 7/2016 | Brown | G06Q 30/0241 |
| 2017/0346851 | A1* | 11/2017 | Drake | H04L 63/1466 |

OTHER PUBLICATIONS

Shen, Weicheng et al. Evaluation of Automated Biometrics-Based Identification and Verification Systems. Proceedings of the IEEE, vol. 85, Issue: 9. https://ieeexplore.ieee.org/stamp/stamp.jsp?tp=&arnumber=628719 (Year: 1997).*
Togneri, Roberto and Pullella, Daniel. An Overview of Speaker Identification: Accuracy and Robustness Issues. IEEE Circuits and Systems Magazine, vol. 11, Issue: 2. https://ieeexplore.ieee.org/stamp/stamp.jsp?tp=&arnumber=5871484 (Year: 2011).*
Sy, Bon K., et al. Secure Information Processing with Privacy Assurance—Standard based Design and Development for Biometric Applications. 2010 Eighth International Conference on Privacy, Security and Trust. https://ieeexplore.ieee.org/stamp/stamp.jsp?tp=&arnumber=5593255 (Year: 2010).‡
Haron, Galoh Rashidah, et al. User Behaviour and Interactions for Multimodal Authentication. 2016 14th Annual Conference on Privacy, Security and Trust (PST). https://ieeexplore.ieee.org/stamp/stamp.jsp?tp=arnumber=7906979 (Year: 2016).‡
Biocryptology Universal Identity Platform, https://www.biocryptology.com, Oct. 25, 2018, 5 pages.
Breeze Visual Customer Care Pvt. Ltd., "Breeze Omni-Channel Customer Care," www.BreezeIVR.com, Oct. 25, 2018, 2 pages.
Fast Customer, www.FastCustomer.com, Oct. 25, 2018, 3 pages.
Haron G.R., et al., User Behaviour and Interactions for Multimodal Authentication, 2016 14th Annual Conference on Privacy, Security and Trust (PST), Retrieved from the Internet: URL:,https://ieeexplore.ieee.org/stamp/stamp.jsp?tp=&arnumber=7906979" title=" Link: https://ieeexplore.ieee.org/stamp/stamp.jsp?tp=&arnumber=7906979">https://ieeexplore.ieee.org/stamp/stamp.jsp?tp=&arnumber=7906979, 2016, 8 pages.
Sy,B.K., et al., Secure Information Processing with Privacy Assurance—Standard based Design and Development for Biometric Applications, 2010 Eighth International Conference on Privacy, Security and Trust, Retrieved from the Internet: URL: https://ieeexplore.ieee.org/stamp/stamp.jsp?tp=&arnumber=5593255" title=41 Link: https://ieeexplore.ieee.org/stamp/stamp.jsp?tp=;arnumber=5593255https://ieeexplore.ieee.org/stamp/stamp.jsp?tp=arnumber=5593255, 2010, 8 pages.

\* cited by examiner
‡ imported from a related application

QUEUE MANAGEMENT BASED ON BIOMETRIC AUTHENTICATION

RELATED APPLICATION

This application is a continuation of U.S. patent application Ser. No. 15/972,921, filed May 7, 2018 (now U.S. Pat. No. 10,250,599), which is incorporated herein by reference.

BACKGROUND

Biometric authentication is used as a form of identification and access control. Biometric identifiers are the distinctive, measurable characteristics used to label and describe individuals. Biometric identifiers are often categorized as physiological versus behavioral characteristics. Physiological characteristics are related to the shape of the body. Behavioral characteristics are related to the pattern of behavior of a person, including but not limited to typing rhythm, gait, and voice.

SUMMARY

A method performed by a user device may include obtaining biometric information relating to a user of the user device using a biometric sensor of the user device; determining that the biometric information is valid; generating a biometric indicator indicating that the biometric information is valid; providing a request for a callback from an entity, wherein the request includes the biometric information indicating that the biometric information is valid; and receiving the callback from the entity, wherein the callback is received based on the biometric information indicating that the biometric information is valid, and wherein the callback is associated with an entity identifier that is not provided to the user.

A user device may include a memory; and one or more processors operatively coupled to the memory, the memory and the one or more processors configured to determine that biometric information, relating to a user of the user device and obtained using a biometric sensor of the user device, is valid; generate a biometric indicator indicating that the biometric information is valid; provide a request for a callback from an entity, wherein the request includes the biometric indicator indicating that the biometric information is valid; and receive the callback from the entity, wherein the callback is received based on the biometric token indicating that the biometric information is valid, and wherein the callback is associated with an entity identifier that is not provided to the user.

A non-transitory computer-readable medium may store one or more instructions that, when executed by one or more processors of a user device, cause the one or more processors to obtain biometric information relating to a user of the user device using a biometric sensor of the user device; determine that the biometric information is valid; generate a biometric indicator indicating that the biometric information is valid; provide a request for a callback from an entity, wherein the request is associated with the biometric indicator indicating that the biometric information is valid; and receive the callback from the entity, wherein the callback is received based on the biometric indicator indicating that the biometric information is valid, and wherein the callback is associated with an entity identifier that is not provided to the user.

DETAILED DESCRIPTION

Figure 1A:
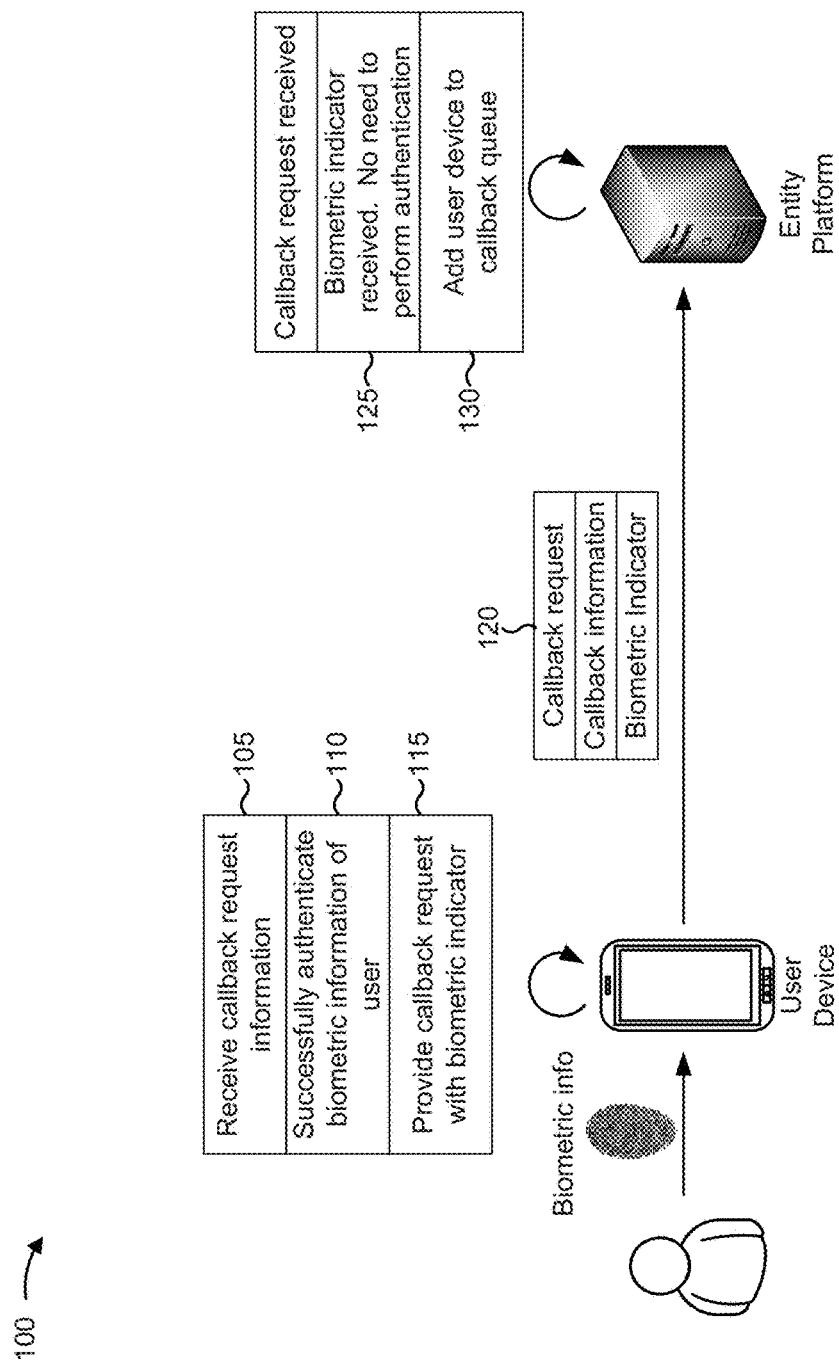
FIGS. 1A and 1B are diagrams of an overview of an example implementation described herein.

The following detailed description of example implementations refers to the accompanying drawings. The same reference numbers in different drawings may identify the same or similar elements.

A user device may perform a call with an entity, such as an entity associated with a call center, a bank, a customer service center, and/or the like. For example, a user of the user device may desire customer support, technical assistance, privileged information, and/or the like. The entity may need to know whether the user device (and/or the user associated with the user device) is authentic before providing sensitive information. To this end, a user of the entity may perform authentication of the user associated with the user device.

One common method of authenticating a user on a call is to provide a verbal challenge, such as a question with an answer that is presumably known only to the user of the user device. However, verbal challenges may be unreliable based on public availability of responses to some challenges (e.g., mother's maiden name, etc.). Furthermore, it may be inherently unsecure to require a user to speak aloud the response to a verbal challenge, since the user may be in a public place or may be on a compromised connection (e.g., associated with a man-in-the-middle attack and/or the like). Still further, it may take a significant amount of time for the entity to perform authentication of the user. This may add overhead for the entity and use network, processor, and/or battery resources of the user device and/or an entity platform associated with the entity.

Some implementations described herein may provide local biometric authentication of a user by a user device for the purpose of initiating a call with an entity. The user device may provide a biometric indicator to the entity indicating that biometric authentication of the user was successful. Based on the biometric indicator, the entity may determine that the user does not need to be authenticated, and may proceed with a call without authenticating the user. In this way, network, processor, and battery resources of the user device and/or the entity are conserved that would otherwise be used to perform authentication on the call. Furthermore, security of the user's information may be improved in comparison to some traditional techniques for authenticating users, such as verbal challenges and/or the like.

Some implementations described herein may manage a queue associated with the entity based on the biometric authentication. For example, after the user is authenticated, some implementations described herein may provide information to the entity platform indicating a reason for the call and a biometric indicator that authentication was successful. The entity platform may enter information identifying the user device in a queue for a callback based on the information and/or the biometric indicator. When the information identifying the user device has moved to the end of the queue, the entity platform may place a call to the user device and may perform the call without further authentication of the user or the user device. In this way, network, processor, and/or battery resources of the user device and/or the entity platform may be conserved that would otherwise be used to maintain the call while the user device moves through the queue and/or while authentication of the user is performed on the call.

Some implementations described herein may determine a user device identifier and/or an entity platform identifier (e.g., a phone number, a Voice over Internet Protocol (VoIP) identifier, etc.) for the call to the entity or the callback from the entity, and may use the identifier to perform the call or the callback. For example, the identifier may be procedurally generated (e.g., based on a particular time of day, a particular user device, a queue associated with the user device, etc.), and/or may be obscured from a user of the user device. By generating an identifier for the call, some implementations described herein improve security of the call and prevent user devices from dialing the identifier without proper authentication.

Figure 1B:
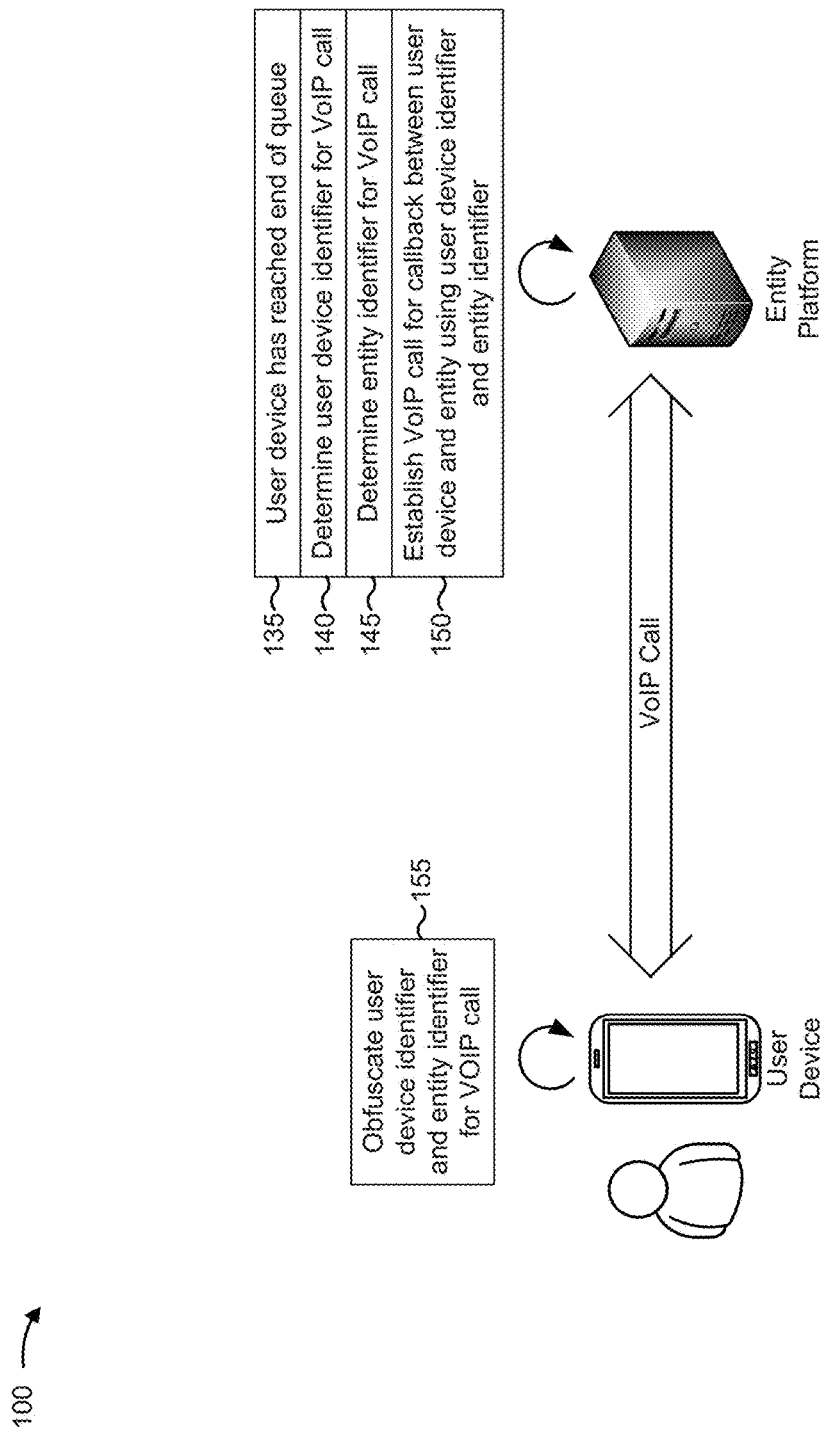

FIGS. 1A and 1B are diagrams of an overview of an example implementation 100 described herein.

As shown in FIG. 1A, and by reference number 105, a user device (e.g., user device 210) may receive callback request information. In some implementations, the user device may determine at least part of the callback request information. In some implementations, the callback request information may identify an entity platform from which the user device is to receive a callback. For example, the entity platform may be associated with a call center with one or more queues, and the callback request information may identify the entity, the one or more queues, and/or the like. The user device may receive the callback request information to cause the user device to authenticate a user using a biometric sensor of the user device. By authenticating the user locally, the user device saves resources and time that would be used to authenticate the user once the callback is performed. Also, as described in more detail below, the user device may receive the callback after the information identifying the user device has reached an end of a queue associated with the entity platform, which conserves resources and time that would be used to maintain a call while the information identifying the user device moves through the queue.

In some implementations, the callback request information may identify the entity platform or an entity associated with the entity platform. For example, the callback information may identify a company, a call center, and/or the like, that is to perform the callback. In some implementations, the user device may identify the entity platform or the entity based on an application of the user device. For example, the application may indicate that the user device is to request a callback from a particular entity platform or entity (e.g., based on an interaction with a user interface of the application) and the user device may determine the callback request information based on the particular device or entity. Additionally, or alternatively, the callback request information may include information identifying the entity platform or the entity.

In some implementations, the callback request information may identify a particular service, queue, problem, and/or the like. For example, the user device may determine that a user desires to speak with a call center regarding a particular service or problem (e.g., based on an interaction by the user with an application of the user device). The user device may generate callback request information that identifies the particular service or problem, so that the entity platform can identify an appropriate queue or call center for the user device. By determining the appropriate queue or call center at the entity platform, processor resources of the user device are conserved that would otherwise be used to determine the appropriate queue or call center.

In some implementations, the user device may determine the appropriate queue or call center. For example, the user device may store information identifying particular queues or call centers for different services or problems, and may identify the appropriate queue or call center based on the stored information. In that case, the callback request information may indicate the appropriate queue or call center, which conserves processor resources of the entity platform that would otherwise be used to determine the appropriate queue or call center.

In some implementations, the user device may receive or determine the callback request information based on an interaction with a user interface. For example, the user interface may provide indicators for various services, problems, call centers, and/or the like. In some implementations, the user device may receive an interaction with an element of the user interface, and may identify an appropriate service, problem, call center, queue, and/or the like based on the interaction.

As shown by reference number 110, the user device may authenticate a user based on receiving the callback request information. For example, the user device may authenticate the user using biometric information regarding the user that is collected by the user device. In some implementations, the user device may collect the biometric information using a biometric sensor of the user device (e.g., a fingerprint scanner, an eye scanner, etc.). In some implementations, the user device may collect the biometric information using another input component of the user device (e.g., a camera, a microphone, a keyboard, etc.). In some implementations, the biometric information may include, for example, a fingerprint, an iris scan, a facial scan, a voice sample, a gesture, a typing cadence, and/or any other type of biometric information.

In some implementations, the user device may compare the biometric information to stored information to authenticate the user. For example, the stored information may be stored in a secure fashion (e.g., using a sequestered or secured chip, such as a secure enclave and/or the like). This may improve security of authentication of the user by the user device. When the authentication of the user is successful, the user device may determine or generate a biometric indicator. The biometric indicator may indicate, to a recipient of the biometric indicator (e.g., the entity platform) that biometric authentication of the user was successful. This may obviate the need for the recipient of the biometric indicator to authenticate the user (e.g., which may use less secure methods than the biometric authentication performed by the user device). Furthermore, the biometric authentication of the user by the user device may be quicker than authentication that is performed on the call by the entity platform. Thus, security and speed of authentication are improved.

In some implementations, the user device may determine particular biometric information to gather based on the entity that is to be called. For example, assume that a first entity desires a first form of biometric authentication and assume that a second entity desires a second form of biometric authentication. In that case, the user device may perform the first form of biometric authentication when the first entity is to be called, and may perform the second form of biometric authentication when the second entity is to be called. Thus, the user device and/or the entity platform may conserve processor resources and network resources that would otherwise be used to perform an inappropriate form of biometric authentication.

In some implementations, the user device may provide the biometric information for authentication of the user. For example, the user device may provide the biometric information to the entity platform and the entity platform may perform the authentication. This may conserve processor resources of the user device that would otherwise be used to perform authentication of the biometric information. In some implementations, performing the biometric authentication locally to the user device may improve security of the biometric information and conserve network resources that would otherwise be used to provide the biometric information to another device for authentication.

As shown by reference number 115, the user device may provide a callback request with a biometric indicator. As shown by reference number 120, the callback request may include callback information and the biometric indicator. In some implementations, the callback information may include information identifying the user device (e.g., an identifier of the user device, a phone number, an Internet Protocol address, account information of the user device, etc.). In some implementations, the callback information may include information for determining a callback number of the user device. For example, when the callback number can be selected from a set of callback numbers, the callback information may include information identifying the set of callback numbers from which the callback number is to be selected. As used herein, a callback number refers to any information used by the entity platform to perform a call to the user device, and is not limited to numbers. For example, the callback number may include a phone number, an Internet Protocol (IP) address, a Voice over IP (VoIP) address, an email address, and/or the like.

As shown by reference number 125, the entity platform may determine that no authentication is to be performed for the user device based on receiving the biometric indicator. For example, the entity platform may determine that the user device (and/or a user of the user device) has previously been authenticated based on the biometric indicator. Thus, the entity platform may not perform authentication of the user device. In some implementations, the entity platform may provide an indication to a user associated with the entity platform that indicates that authentication is not to be performed for the user device. For example, when the entity platform (or a related device) has placed the callback to the user device, the entity platform may provide an indication, to a user, indicating that the authentication is not to be performed. In this way, network resources associated with the call are conserved that would otherwise be used in connection with re-authenticating the user device.

In some implementations, the entity platform may determine that no further authentication is to be performed for the user device based on the entity platform's biometric authentication of the user device. For example, in a case when the entity platform receives biometric information from the user device for authentication of the user device, the entity platform may perform the authentication. The entity platform may determine, based on a result of the authentication, that further authentication of the user device (e.g., by a user associated with the entity platform) is not needed. Thus, the entity platform may conserve network resources that would otherwise be used in connection with re-authenticating the user device.

As shown by reference number 130, the entity platform may add information identifying the user device to a callback queue. For example, the entity platform may be associated with one or more callback queues. A callback queue may store information associated with user devices (e.g., user device identifiers, callback numbers, account information, etc.) for user devices that are to receive a callback from the entity platform. For example, the entity platform may perform calls with user devices as the user devices reach the end of the callback queue. This may allow the user devices to receive the callback without maintaining a call with the entity platform, thus conserving resources of the entity platform and the user devices.

In some implementations, the entity platform may be associated with multiple, different callback queues. For example, the entity platform may be associated with multiple callback queues for different user issues, different levels of support, different service levels, different geographical locations, different types of user devices or entity platforms, different priorities of callbacks, and/or the like. In such a case, the entity platform may select a callback queue, and may add information identifying the user device to the selected callback queue. In some implementations, the entity platform may select the selected callback queue based on the callback information. In some implementations, the entity platform may select the selected callback queue based on a reason for the callback (e.g., specified by the user device or determined by the entity platform), which may or may not be identified by the callback information. In some implementations, the entity platform may select the selected callback queue based on the user device (e.g., based on a location of the user device, based on a type of the user device, based on a configuration of the user device, etc.). In some implementations, the entity platform may select the selected callback queue based on a type of callback to be performed. For example, the entity platform may select a first callback queue when the callback is to be a VoIP call, and may select a second callback queue when the callback is to be a video call.

As shown in FIG. 1B, and by reference number 135, the entity platform may determine that the information identifying the user device has reached an end of the queue. For example, the entity platform may determine that a callback is to be performed for the user device based on a location of the information identifying the user device in the queue. In some implementations, the entity platform may determine that a callback is to be performed based on resource availability associated with the entity platform. For example, the entity platform may determine that the callback is to be performed when a user associated with the entity platform is available to perform the call, when call resources (e.g., network resources, a calling device, etc.) are available for the call, and/or the like.

As shown by reference number 140, the entity platform may determine a user device identifier for a VoIP call. As shown by reference number 145, the entity platform may determine an entity identifier for a VoIP call. For example, the user device identifier and the entity identifier may be used to perform the callback. In some implementations, the user device identifier and/or the entity identifier may include any information for placing a call, such as a callback number, a VoIP identifier, and/or the like. In some implementations, the entity platform may determine the user device identifier based on the callback request and/or the callback information. For example, the callback request and/or the callback information may identify the user device identifier.

In some implementations, the entity platform may determine the entity identifier based on a device to perform the callback. For example, the entity platform may determine the entity identifier as an identifier of the device to perform the callback. In some implementations, the entity platform may determine the entity identifier based on an entity identifier associated with a user to perform the callback, based on an entity identifier associated with an entity associated with the entity platform, and/or the like.

In some implementations, the entity platform may select the user device identifier from a plurality of user device identifiers. Additionally, or alternatively, the user device identifier may change over time. For example, the entity platform may store or have access to information identifying the plurality of user device identifiers. Different sets of user device identifiers, of the plurality of user device identifiers, may be associated with different values or selection criteria. For example, a first set of user device identifiers may be used for calls within a first time period, and a second set of user device identifiers may be used for calls within a second time period. In such a case, the entity platform may select the user device identifier based on a time period associated with the user device (e.g., a current time period, a time period at which the user device provided the callback request, etc.). The user device may know the values or selection criteria used for the call, and may receive the call based on the values or selection criteria. By selecting the user device identifier from different sets of user device identifiers, security of the callback may be improved. For example, a malicious entity seeking to spoof a callback may not know the values or selection criteria, and therefore may not be able to place a spoofed call using the correct user device identifier. In some implementations, the entity platform may perform operations similar to those described above for the entity identifier. Thus, security of the entity platform may be improved.

As shown by reference number 150, the entity platform may establish the VoIP call for a callback between the user device and the entity platform. For example, the entity platform may perform the callback between the user device and the entity platform based on the user device identifier and the entity identifier. In some implementations, the entity platform may place the call. In some implementations, the entity platform may cause or provide information for another device, associated with the entity platform, to place the call (e.g., a user device of a user associated with the entity). In some implementations, the entity platform may provide an indication, to a user associated with the entity platform, that authentication is not to be performed for the user device. In this way, the entity platform may perform, or may cause to be performed, the callback when the information identifying the user device reaches the end of the queue. Thus, network resources that would otherwise be used to maintain the call while the information identifying the user device moves through the queue, and while authentication of the user device is performed, are conserved.

As shown by reference number 155, the user device may obfuscate the user device identifier and the entity identifier for the VoIP call. For example, the user device may not provide, to a user of the user device (e.g., via display, sound, or another fashion), information identifying the user device identifier or the entity identifier. This may prevent the user from calling the entity identifier, which reduces tampering with the queue and which conserves processor resources and network resources of the entity platform that would otherwise be used to handle such unwanted calls. This may also reduce the likelihood of disclosure of the user device identifier used to perform the call, which further reduces the likelihood of interception of the user device identifier by a malicious party. Thus, security of the user device and the entity platform may be improved.

In this way, network, processor, and battery resources of the user device and/or the entity are conserved that would otherwise be used to perform authentication on the call. Furthermore, security of the user's information may be improved in comparison to some traditional techniques for authenticating users, such as verbal challenges and/or the like. In some implementations, network, processor, and/or battery resources of the user device and/or the entity platform may be conserved that would otherwise be used to maintain the call while the information identifying the user device moves through the queue and/or while authentication of the user is performed on the call. In some implementations, by generating an identifier for the call, some implementations described herein improve security of the call and prevent user devices from dialing the identifier without proper authentication.

As indicated above, FIGS. 1A and 1B are provided merely as an example. Other examples are possible and may differ from what was described with regard to FIGS. 1A and 1B.

Figure 2:
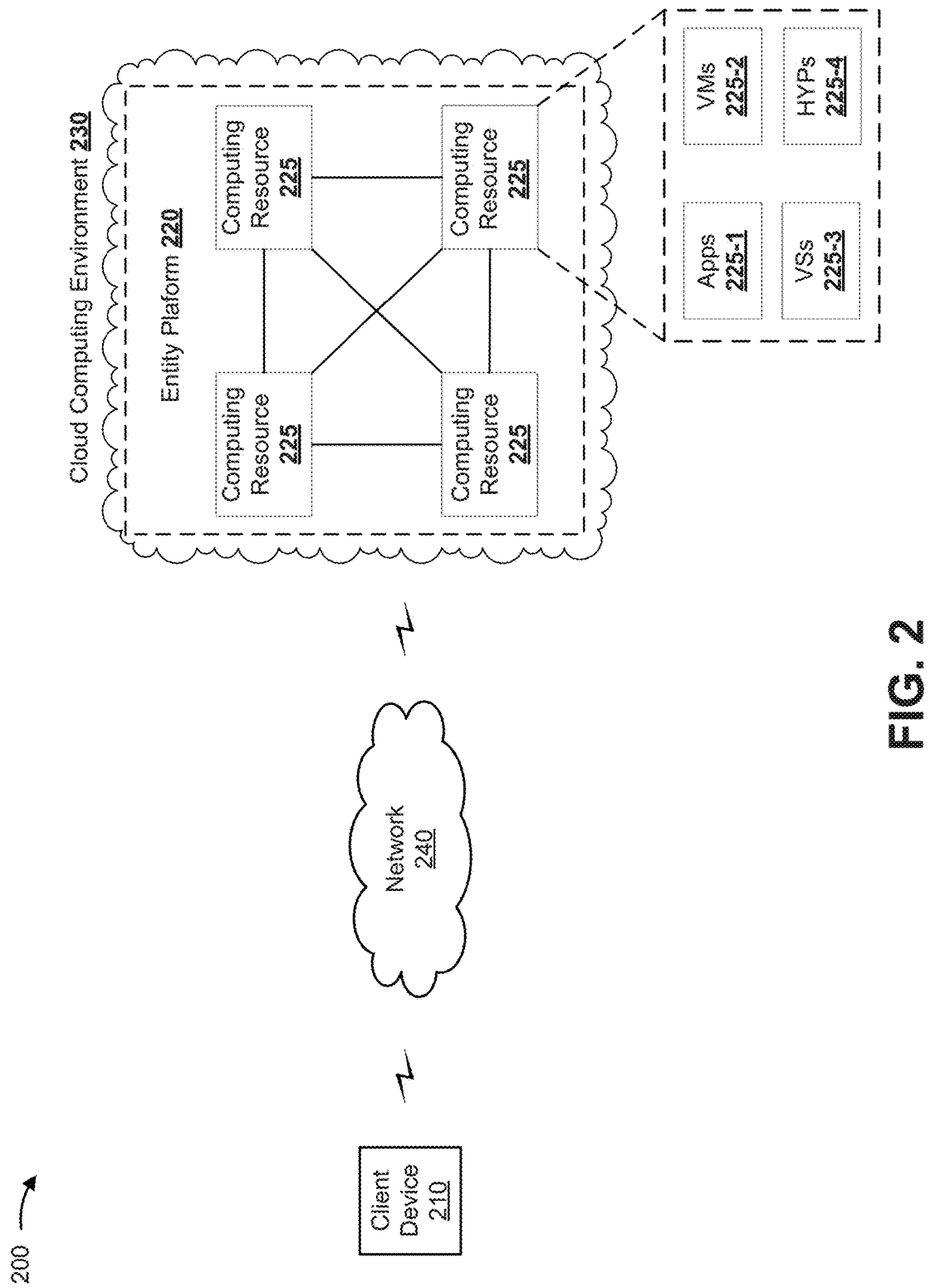
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an entity platform 220 provided in a cloud computing environment 230, and/or a network 240. Devices of environment 200 may interconnect via wired connections, wireless connections, or a combination of wired and wireless connections.

User device 210 includes one or more devices capable of receiving, generating, storing, processing, and/or providing information associated with placing or receiving a call with entity platform 220. For example, user device 210 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. User device 210 may include an input component to receive biometric information associated with a user, storage to store biometric information (e.g., a secure enclave, etc.), and a processor to authenticate a user's biometric information against stored information.

Entity platform 220 includes one or more devices capable of receiving, storing, processing, and/or providing information associated with placing or receiving a call with user device 210. For example, entity platform 220 may include a server, a group of servers, and/or the like. In some implementations, entity platform 220 may be provided in a cloud computing environment 230.

Cloud computing environment 230 includes an environment that delivers computing as a service, whereby shared resources, services, etc. may be provided to the entity platform 220. Cloud computing environment 230 may provide computation, software, data access, storage, and/or other services that do not require end-user knowledge of a physical location and configuration of a system and/or a device that delivers the services. As shown, cloud computing environment 230 may include one or more computing resources 225.

Computing resource 225 includes one or more personal computers, workstation computers, server devices, or another type of computation and/or communication device. In some implementations, computing resource 225 may host entity platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with entity platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
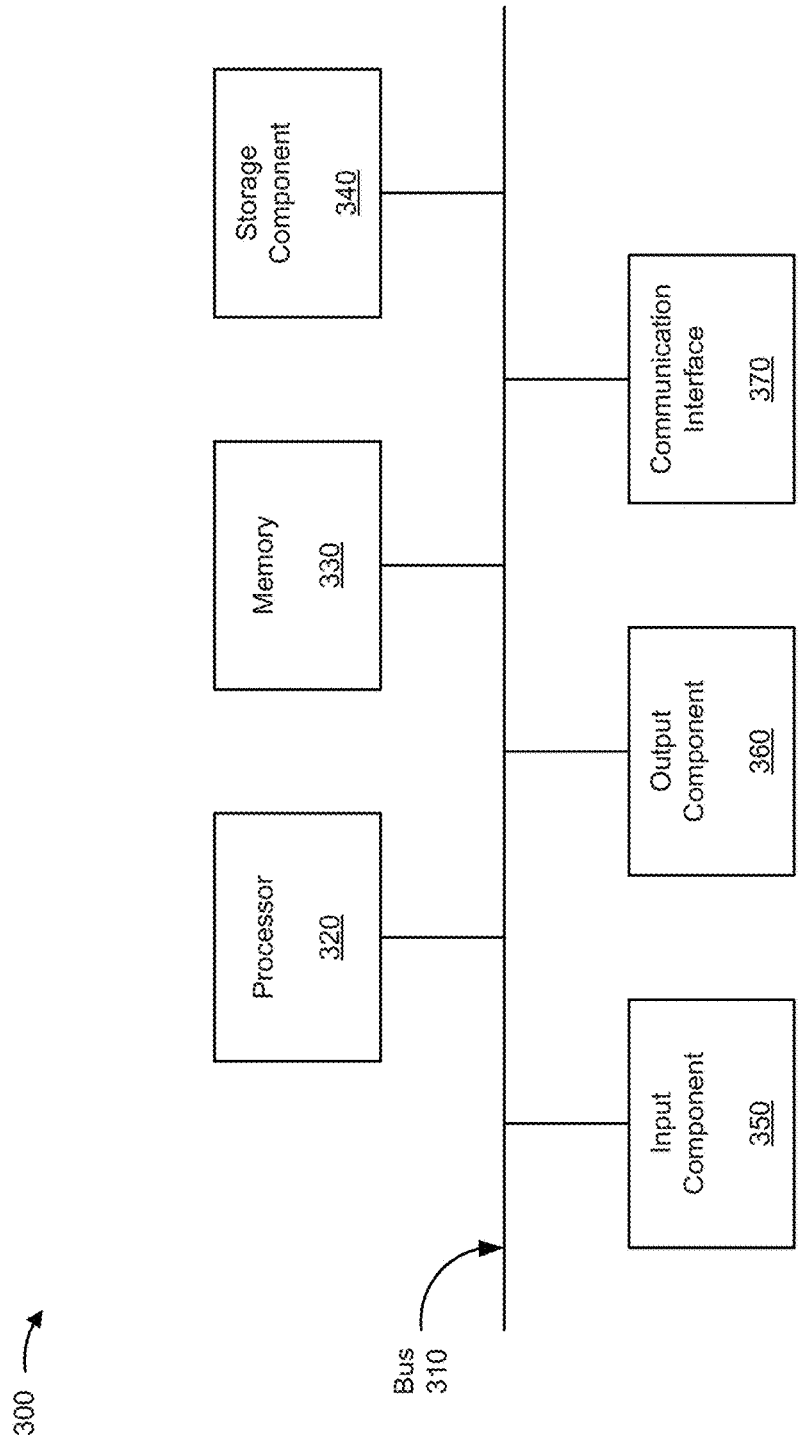
FIG. 3 is a diagram of example components of one or more devices of FIG. 2.

FIG. 3 is a diagram of example components of a device 300. Device 300 may correspond to user device 210 or computing resource 225. In some implementations, user device 210 and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Additionally, or alternatively, input component 350 may include a biometric sensor (e.g., a fingerprint sensor, a camera, etc.). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
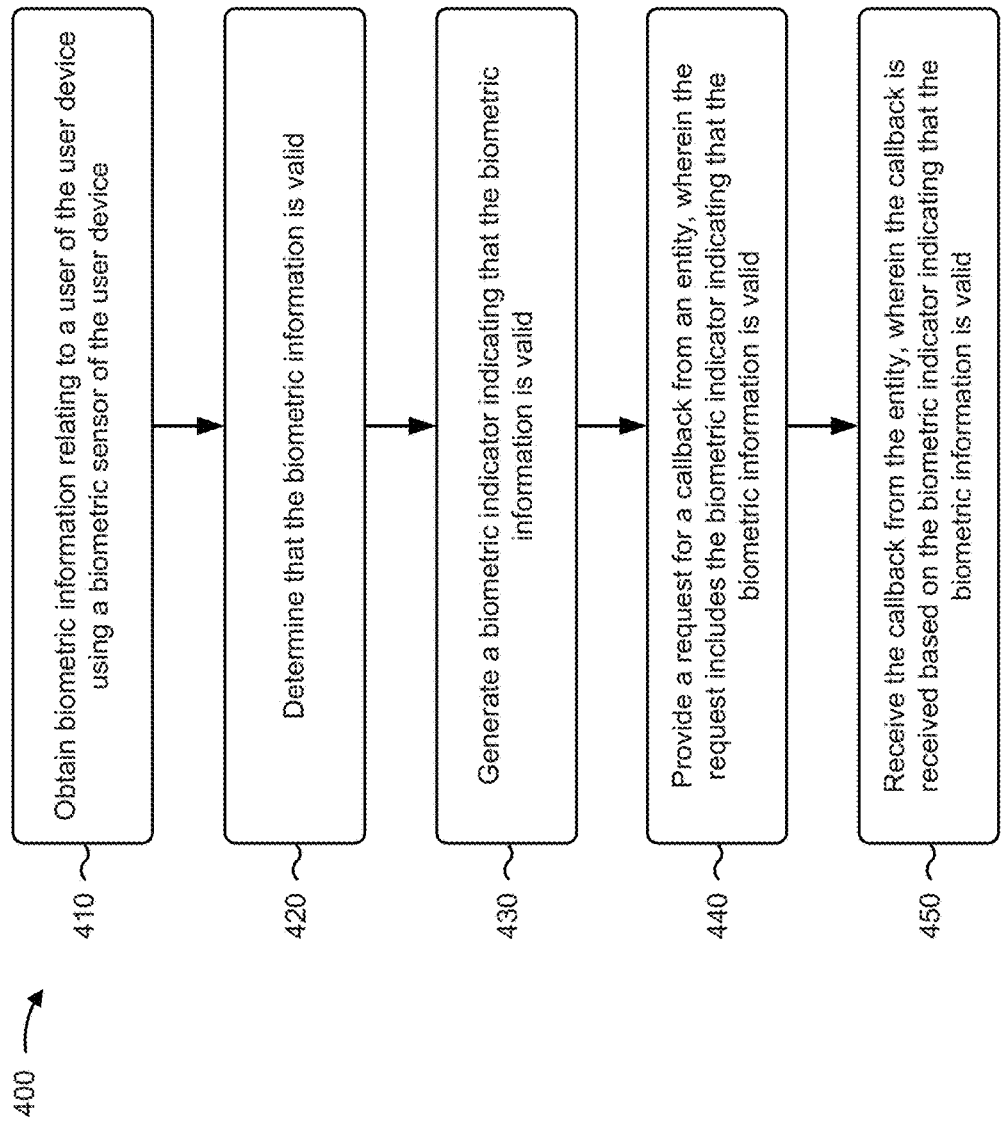
FIG. 4 is a flow chart of an example process for performing a call with a call center based on local biometric authentication of a user.

FIG. 4 is a flow chart of an example process 400 for performing a call with a call center based on local biometric authentication of a user. In some implementations, one or more process blocks of FIG. 4 may be performed by a user device (e.g., user device 210). In some implementations, one or more process blocks of FIG. 4 may be performed by another device or a group of devices separate from or including the user device, such as an entity platform (e.g., entity platform 220).

As shown in FIG. 4, process 400 may include obtaining biometric information relating to a user of the user device using a biometric sensor of the user device (block 410). For example, the user device (e.g., using processor 320, input component 350, and/or the like) may obtain biometric information using a biometric sensor of the user device. The biometric information may relate to a user of the user device. For example, the user may wish to place (or receive) a call with an entity platform, and may provide the biometric information for authentication before the call is placed.

As further shown in FIG. 4, process 400 may include determining that the biometric information is valid (block 420). For example, the user device (e.g., using processor 320 and/or the like) may determine that the biometric information is valid. In some implementations, the user device may determine that the biometric information is valid using a sequestered or secure chip, such as a secure enclave and/or the like. In some implementations, the user device may provide the biometric information to another device (e.g., the entity platform and/or another device), and the other device may determine that the biometric information is valid. In some implementations, the user device may perform authentication of the user using the biometric information and/or the like.

As further shown in FIG. 4, process 400 may include generating a biometric indicator indicating that the biometric information is valid (block 430). For example, the user device (e.g., using processor 320 and/or the like) may generate a biometric indicator. The biometric indicator may indicate, to a recipient of the biometric indicator, that the biometric information is valid. For example, the biometric indicator may indicate that the user of the user device has been successfully authenticated.

As further shown in FIG. 4, process 400 may include providing a request for a callback from an entity, wherein the request includes the biometric indicator indicating that the biometric information is valid (block 440). For example, the user device (e.g., using processor 320, output component 360, communication interface 370, etc.) may provide a request for a callback from an entity. In some implementations, the user device may provide the request for the callback to an entity platform associated with the entity. The request for the callback may include the biometric indicator. In some implementations, the request for the callback may include other information, such as callback information for the user device.

As further shown in FIG. 4, process 400 may include receiving the callback from the entity, wherein the callback is received based on the biometric indicator indicating that the biometric information is valid (block 450). For example, the user device (e.g., using processor 320, communication interface 370, etc.) may receive the callback from the entity. In some implementations, the user device may receive the callback based on the biometric indicator. For example, the entity platform may place the call when the biometric indicator indicates that the biometric information is valid. In some implementations, the entity platform (or a user associated with the entity platform) may not perform authentication of the user of the user device based on the biometric indicator. In some implementations, the callback may be associated with an entity identifier that is not provided to a user of the user device. For example, the entity identifier (and/or a user device identifier associated with the user device) may be obfuscated from the user or may not be provided to the user.

Process 400 may include additional implementations, such as any single implementation or any combination of implementations described below.

In some implementations, the request indicates a queue associated with the callback. In some implementations, the user device receives the callback from the entity based on a user device identifier that is not provided to the user. In some implementations, the user device identifier is configured to change over time. In some implementations, the callback is received using a Voice over Internet Protocol connection.

In some implementations, the entity is associated with a call center. In some implementations, the request for the callback includes information identifying a reason for the callback. In some implementations, the callback is received based on a position of the request in a queue of the entity. In some implementations, the user device receives the callback from the entity based on a user device identifier that is not provided to the user. In some implementations, at least one of the user device identifier or the entity identifier is configured to change over time. In some implementations, the user device identifier is determined based on information associated with the user device or the user. In some implementations, the user device may provide the request to the entity.

In some implementations, the biometric information includes visual information or fingerprint information. In some implementations, the callback is received without performing further validation or authentication of the user device or the user. In some implementations, the entity is associated with a customer service call center. In some implementations, the request indicates at least one of a queue for the callback or a reason for the callback. In some implementations, the request includes account information for the user with regard to the entity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
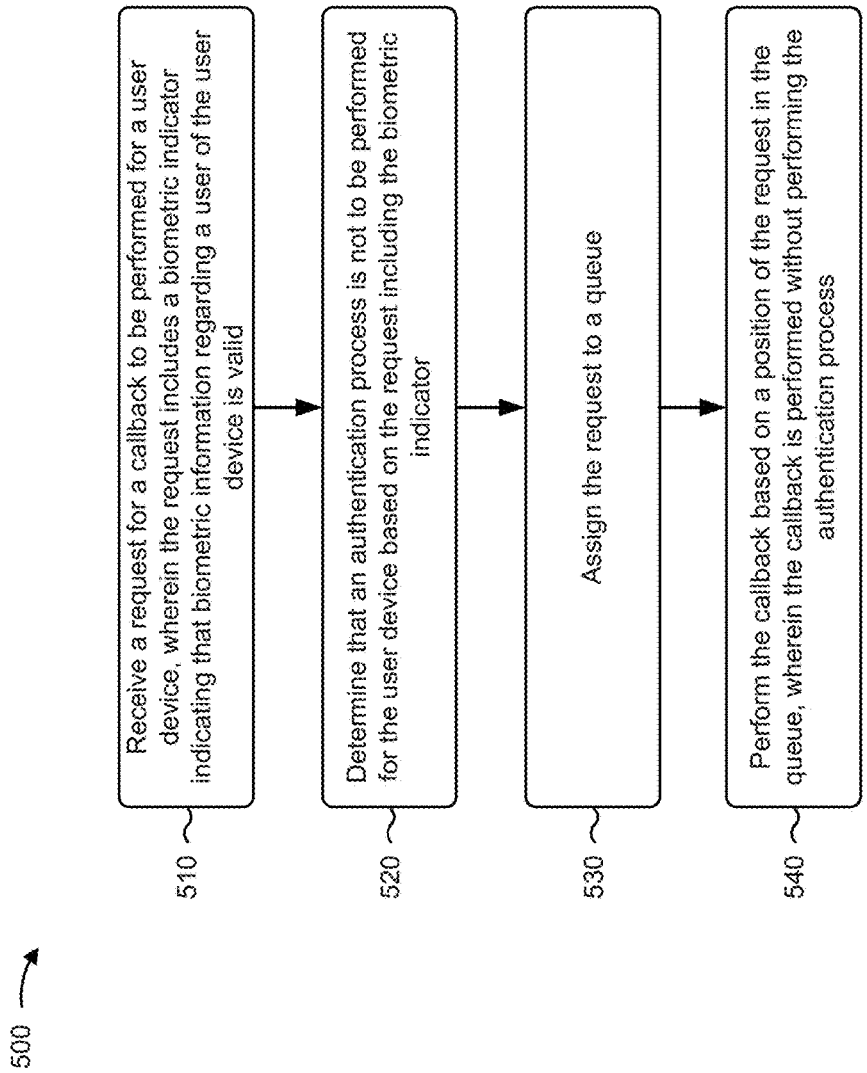
FIG. 5 is a flow chart of an example process for performing a call with a user device based on biometric authentication of a user of the user device.

FIG. 5 is a flow chart of an example process 500 for performing a call with a user device based on biometric authentication of a user of the user device. In some implementations, one or more process blocks of FIG. 5 may be performed by an entity platform (e.g., entity platform 220). In some implementations, one or more process blocks of FIG. 5 may be performed by another device or a group of devices separate from or including the entity platform, such as a user device (e.g., user device 210).

As shown in FIG. 5, process 500 may include receiving a request for a callback to be performed for a user device, wherein the request includes a biometric indicator indicating that biometric information regarding a user of the user device is valid (block 510). For example, the entity platform (e.g., using processor 320, communication interface 370, and/or the like) may receive a request for a callback from a user device. The request for the callback may include a biometric indicator. The biometric indicator may indicate that authentication or validation of a user, based on biometric information associated with the user, was successful. For example, the authentication or validation may be performed by the user device or by another device (e.g., the entity platform or another device).

As further shown in FIG. 5, process 500 may include determining that an authentication process is not to be performed for the user device based on the request including the biometric indicator (block 520). For example, the entity platform (e.g., using processor 320 and/or the like) may determine that an authentication process (e.g., and/or a validation process) is not to be performed for the user device. In some implementations, the authentication process may be a biometric authentication process for a user of the user device. The entity platform may determine that the authentication process is not to be performed based on receiving the biometric indicator in association with the request.

As further shown in FIG. 5, process 500 may include assigning the request to a queue (block 530). For example, the entity platform (e.g., using processor 320 and/or the like) may assign the request to a queue. The queue may be a queue for determining when a callback is to be performed with regard to the user device. For example, the entity platform (or another device) may perform the callback for a particular user device when the particular user device reaches an end of the queue. In some implementations, the entity platform may assign the request to one of multiple different queues, as described in more detail elsewhere herein.

As further shown in FIG. 5, process 500 may include performing the callback based on a position of the request in the queue, wherein the callback is performed without performing the authentication process (block 540). For example, the entity platform (e.g., using processor 320, communication interface 370, and/or the like) may perform the callback based on a position of the request in the queue. In some implementations, the callback may be performed without performing the authentication process. For example, the entity platform (or a device or user associated with the entity platform) may not perform authentication (e.g., challenge-based authentication or another form of authentication) based on the biometric indicator. In some implementations, the entity platform may perform the callback using a user device identifier that is selected from a plurality of user device identifiers based on a time at which the callback is performed. In some implementations, the entity platform may select the user device identifier and/or an entity identifier based on the time or based on another consideration, as described in more detail elsewhere herein.

Process 500 may include additional implementations, such as any single implementation or any combination of implementations described in connection with FIG. 1A, 1B, or 4, or elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, network, processor, and battery resources of user device 210 and/or the entity platform 220 are conserved that would otherwise be used to perform authentication on the call. Furthermore, security of the user's information may be improved in comparison to some traditional techniques for authenticating users, such as verbal challenges and/or the like. In some implementations, network, processor, and/or battery resources of the user device 210 and/or the entity platform 220 may be conserved that would otherwise be used to maintain the call while the user device 210 moves through the queue and/or while authentication of the user is performed on the call. In some implementations, by generating an identifier for the call, some implementations described herein improve security of the call and prevent user devices 210 from dialing the entity platform 220 without proper authentication.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a callback request from a user device, the callback request including:
      biometric information, and
      a device identifier associated with the user device;
   approving, by the device and based on authentication of a user of the user device based on the biometric information, a callback to the user device;
   storing, by the device and based on receiving the callback request, call data in a callback queue, the call data including:
      the device identifier, and
      authentication data indicating a result of the authentication of the user;
   providing, by the device and to a callback device and when the callback is to be performed, callback data, the callback data including:
      data indicating that the callback is to be performed by the callback device, and
      the device identifier; and
   providing, by the device and to the callback device, authentication information, the authentication information including:
      the authentication data, and
      one or more instructions indicating that authentication is not to be performed during the callback.

2. The method of claim 1, wherein the callback queue is one of a plurality of callback queues; and
   wherein storing the call data in the callback queue comprises:
      identifying the callback queue, from the plurality of callback queues, based on data included in the callback request; and
      store the call data in the callback queue based on identifying the callback queue.

3. The method of claim 1, wherein the callback request further includes at least one of:
   data indicating a reason for the callback request,
   data indicating a user issue,
   data indicating a particular service,
   data indicating a level of support associated with the callback request,
   data indicating a level of service associated with the callback request,
   data indicating a geographic location associated with the user device,
   data indicating a device type associated with the user device, or
   data indicating a priority associated with the callback request.

4. The method of claim 1, further comprising:
   determining to provide the callback data based on the call data and at least one of:
      a position of the call data in the callback queue, or
      an availability of the callback device.

5. The method of claim 1, wherein a callback number is specified in the callback request; and
   the method further comprises:
      providing, to the callback device, the callback number.

6. The method of claim 1, wherein the device identifier is associated with a plurality of callback numbers; and
   the method further comprises:
      identifying a callback number from the plurality of callback numbers; and
      providing, to the callback device, the callback number.

7. The method of claim 6, wherein the device identifier comprises an account identifier, and the callback number comprises one of:
   a phone number,
   an internet protocol (IP) address,
   a voice over IP (VoIP) number, or
   an e-mail address.

8. A device, comprising:
   a memory; and
   one or more processors communicatively coupled to the memory, the one or more processors configured to:
      receive a callback request from a user device, the callback request including:
         biometric information indicating that a user of the user device has been authenticated, and
         a device identifier associated with the user device;
      store, based on receiving the callback request, call data in a callback queue, the call data including:
         the device identifier, and
         authentication data indicating a result of authenticating the user;
      provide, to a callback device and when a callback to the user device is to be performed, callback data, the callback data including:
         data indicating that the callback is to be performed by the callback device, and
         the device identifier; and
      provide, to the callback device, authentication information, the authentication information including:
         the authentication data, and
         one or more instructions indicating that authentication is not to be performed during the callback.

9. The device of claim 8, wherein the one or more processors are further configured to:

provide, to the user device, data indicating that authentication is not be performed for the callback.

10. The device of claim 8, wherein the callback request includes data identifying the callback queue; and
wherein the one or more processors, when storing the call data in the callback queue, are further configured to:
identify the callback queue, from a plurality of queues, based on the data identifying the callback queue; and
store the call data in the callback queue based on identifying the callback queue.

11. The device of claim 8, wherein the callback request includes request data identifying at least one of:
a particular service associated with the callback, or
a particular problem associated with the callback.

12. The device of claim 8, wherein the one or more processors are further configured to:
identify a callback number based on the device identifier and a time associated with the callback; and
provide the callback number to the callback device.

13. The device of claim 8, wherein the one or more processors are further configured to:
determine to provide the callback data based on the call data and at least one of:
a position of the call data in the callback queue, or
an availability of the callback device.

14. The device of claim 8, wherein the device identifier is associated with a plurality of callback numbers; and
the one or more processors are further configured to:
identify a callback number from the plurality of callback numbers; and
provide, to the callback device, the callback number.

15. A non-transitory computer-readable medium storing one or more instructions, the one or more instructions comprising:
one or more instructions that, when executed by one or more processors, cause the one or more processors to:
receive a callback request from a user device, the callback request including:
biometric information indicating that a user of the user device has been authenticated, and
a device identifier associated with the user device;
store, based on receiving the callback request, call data in a callback queue, the call data including:
the device identifier, and
authentication data indicating a result of authenticating the user;
provide, to a callback device and when a callback to the user device is to be performed, callback data, the callback data including:
data indicating that the callback is to be performed by the callback device, and
the device identifier; and
provide, to the callback device and based on the biometric information indicating that the user of the user device has been authenticated, authentication information, the authentication information including:
one or more instructions indicating that authentication is not to be performed during the callback.

16. The non-transitory computer-readable medium of claim 15, wherein the callback queue is one of a plurality of callback queues; and
wherein the one or more instructions, that cause the one or more processors to store the call data in the callback queue, further cause the one or more processors to:
identify the callback queue, from the plurality of callback queues, based on data included in the callback request; and
store the call data in the callback queue based on identifying the callback queue.

17. The non-transitory computer-readable medium of claim 16, wherein the data included in the callback request includes at least one of:
data indicating a reason for the callback request,
data indicating a user issue,
data indicating a particular service,
data indicating a level of support associated with the callback request,
data indicating a level of service associated with the callback request,
data indicating a geographic location associated with the user device,
data indicating a device type associated with the user device, or
data indicating a priority associated with the callback request.

18. The non-transitory computer-readable medium of claim 16, wherein the one or more instructions further cause the one or more processors to:
identify the callback device from a plurality of callback devices based on the data included in the callback request.

19. The non-transitory computer-readable medium of claim 15, wherein the callback request includes data identifying the callback queue; and
wherein the one or more instructions, that cause the one or more processors to store the call data in the callback queue, further cause the one or more processors to:
identify the callback queue, from a plurality of queues, based on the data identifying the callback queue; and
store the call data in the callback queue based on identifying the callback queue.

20. The non-transitory computer-readable medium of claim 15, wherein the callback request includes request data identifying at least one of:
a particular service associated with the callback, or
a particular problem associated with the callback.

* * * * *